UNITED STATES PATENT OFFICE.

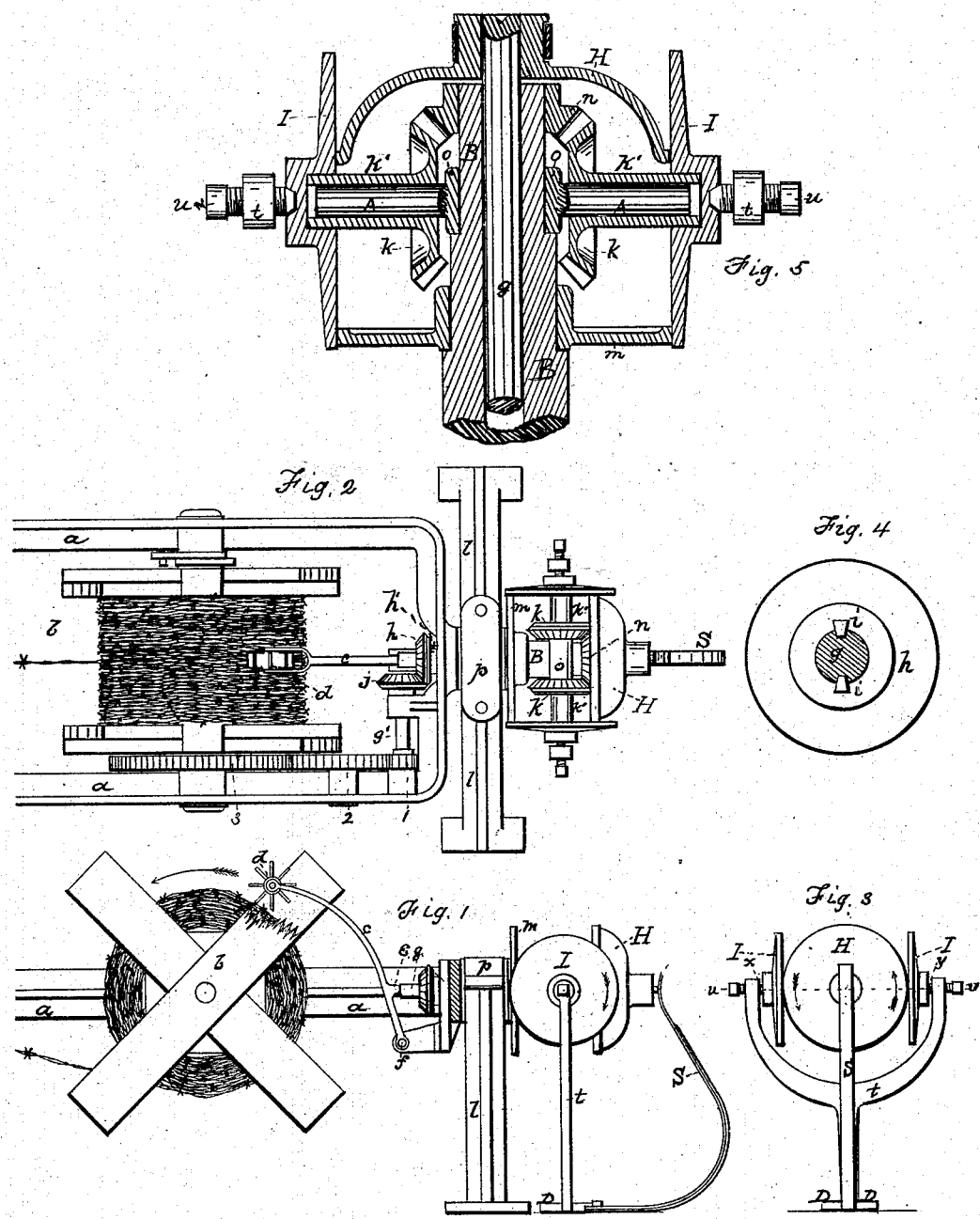

DAVID G. WELLS, OF JOLIET, ILLINOIS, ASSIGNOR TO THE WASHBURN & MOEN MANUFACTURING COMPANY, OF WORCESTER, MASSACHUSETTS, AND ISAAC L. ELLWOOD, OF DE KALB, ILLINOIS.

MACHINE FOR SPOOLING BARBED FENCE-WIRE.

SPECIFICATION forming part of Letters Patent No. 288,530, dated November 13, 1883.

Application filed July 17, 1882. (No model.)

*To all whom it may concern:*

Be it known that I, DAVID G. WELLS, of the city of Joliet, in Will county, and State of Illinois, have invented certain new and useful Improvements in Machines for Twisting and Winding Barbed Wire for Fences, the construction and operation of which I will proceed to explain, reference being had to the annexed drawings, hereinafter described, making a part of this specification.

This invention relates to the means for regulating the speed of the spool upon which the barbed wire is wound during the process of its manufacture.

In barbed-wire machines generally the strand-wire is carried into the machine at a uniform speed, so that the barbs may be set in equal spaces, and the spool which receives the finished barbed wire must therefore revolve faster at the beginning and slower at the end of the spooling. In such machines the spool is driven by a brush-wheel which has its periphery in frictional contact with one of the spool-heads or with spool-shaft, and rotates with such rapidity as to drive the spool at the start fast enough to take up the completed barbed wire as fast as finished. Of course, the increasing diameter of the spool will cause it to gradually draw with increasing force upon the wire, and would propel it too rapidly if the spool were moved by positive gearing; but the frictional driving-wheel simply slips after the wire is taut, and thus a great deal of power is wasted and the contact-surfaces are rapidly worn.

The object of this invention is to give a uniform rate of speed to the surface of the spool upon which the barbed wire is being wound, and an automatic adjustment to the parts which drive the spool, so that, besides being used as a take-up of the barbed wire, which is fed to it as in other machines, the spool with this improvement will be employed to bring the wire into the machine at a uniform rate of speed.

My invention consists in certain novel combinations of devices, which will be fully understood from the drawings and following particular description, and will be pointed out in the appended claims.

In the accompanying drawings similar letters of reference indicate like parts.

Figure 1 is a side elevation of that portion of the machine to which my improvement relates, certain parts of the machine being omitted in order that others may be seen; Fig. 2, a plan view of the complete mechanism; Fig. 3, an end elevation; Fig. 4, an end view of the grooved shaft, enlarged; and Fig. 5, an enlarged sectional view on the dotted lines $x\ y$ of Fig. 3, and shows more clearly the adjustable parts which drive the spool.

The spool is located in that portion of the machine called the "twister," the frame $a$ of which has a projecting hollow shaft, B, extending through the pillow-block $p$, which is supported by the legs $l\ l$, which stand upon the floor. In Fig. 1 that part of the machine $a$ nearest the beholder is removed, in order to show the improvement more clearly.

$b$ is the spool, which in the drawings is shown about half-full of wound wire, upon the surface of which rests the roller $d$, attached to the upper end of the lever $c$, the other end being pivoted at $f$ to the frame $a$. The projection $e$ on the lever $c$ presses against the end of the grooved shaft $g$. This shaft is free to move endwise through the miter-wheel $h$ and hollow shaft B; but the feathers $i\ i$ in the wheel $h$, fitting the grooves in said shaft, prevents the shaft from turning without turning the wheel $h$ with it, said wheel $h$ having a back bearing against the end of a sleeve, $h'$, which projects from the frame $a$. The wheel H is fast upon the outer end of the shaft $g$ and rolls upon the surface of the disk-wheels I I, which are fast upon the hollow shafts $k'\ k'$ of the miter-wheels $k\ k$.

O is a loose strap or collar around the shaft B, and has on its opposite sides the projecting spindles A A, upon which the hollow shafts $k'\ k'$, carrying the miter-wheels $k\ k$, revolve, these wheels being fixed to the ends of the sleeves $k'\ k'$, which can slide longitudinally as well as rotate upon said spindles. These wheels are rotated in opposite directions by being in connection with the miter-wheel $n$, which is fast upon the hollow shaft B. The idle-wheel $m$ is used to prevent undue wear on the side of the spindles A A by receiving the frictional contact of the wheels mounted upon said spindles. The spring S is fastened to the floor at its lower end, while the upper end presses against the outer end of the shaft g, in order to keep the roller d in contact with the surface of the wound wire on the spool. The forked support t is provided with adjusting-screws u u, which press against the centers of the disk-wheels I I and keep them in close contact with the periphery of the wheel H. The shank of this support extends down to the floor, where it is held from turning with the shaft B by the stops D D on either side of it. The miter-wheel j gears with the miter-wheel h, and is fast on one end of the shaft g', while to the other end is fastened the pinion-wheel 1. Wheel 1 drives wheel 2, and wheel 2 drives wheel 3, which drives the spool.

The operation of this mechanism is as follows: The rotation of the bevel-wheel h being in the same direction as the rotation of the frame a, as the twister-frame rotates, the wheel j upon shaft g', which latter is mounted in bearings in the frame a, is caused to travel around the bevel-wheel h, which is rotated at a slower rate of speed than the twister-frame, causing the rotation of the shaft g', with its pinion-wheel 1, which, meshing with wheel 2 and wheel 2 with wheel 3 upon the axis of the spool, rotates said spool, the speed of rotation of the spool being controlled by the speed of rotation of the bevel-wheel h. If the twister-frame is rotated over toward the observer, and the winding of the barbed wire upon the spool has just begun, the roller end of the lever c will be nearest the axis of the spool b, and the wheel H, being pushed in by the spring S, will be nearest the axis of the disks I I and be rotated at its slowest speed. The bevel-wheel h, rotating in unison with wheel H, will also be rotated at its slowest speed. The frame being rotated at a greater speed than wheel h, rotation is imparted to bevel-wheel j, and by the connecting-gearing to the spool b, which is rotated at its greatest speed. As the spool b is filled, the lever c is forced away from the axis of the spool, and its projection e, pressing against the shaft g, moves it through the wheel h and hollow shaft B, gradually pushing the wheel H outward toward the periphery of the disks I I, giving to wheel H and bevel-wheel h gradually-increasing speed of rotation, which increase of rotation decreases the speed of rotation of bevel-wheel j, the intermediate gearing, and of spool b, which admits of the regular winding of the wire upon the spool without straining, owing to the increased diameter of the bulk of wire upon the spool. Thus the desired speed of the surface of the spool from the beginning to the end of its winding can be attained by a due proportion of the length of the lever c, and in the gearing which drives the spool, and all these proportions can be ascertained by arithmetical calculation. It is not absolutely necessary to use the roller d on the end of the lever c, as the upper end of said lever may be bent up so it will bear on the circumference of the wound wire.

Having thus described my invention, what I claim as new, and desire to secure by Letters Patent, is as follows, to wit:

1. The combination, with the twister-frame and hollow shaft B, of the shaft g, rolling wheels H and I I, miter-wheels k k and n, collar o, and spindles A A, supporting said miter-wheels k k, and support t, substantially as described.

2. The combination of the frame a, pinions 1 2 3, shafts g', g, and B, miter-wheels j h k n, rolling wheels I I and H, springs s, support t, screws u, lever c, and roller d, substantially as described.

3. The combination, with the friction-wheels H, I I, and m, of the miter-wheels k k and n, shafts g and B, collar o, spindles A A, and support t, substantially as described.

4. The combination, with the twister-frame having the hollow shaft, of the spool mounted in said frame, the shaft g, arranged in said hollow shaft, gearing between said spool and shaft g, a friction-wheel mounted on said shaft, connecting devices between the shaft g and the hollow shaft, and devices for adjusting said friction-wheel in proportion to the increasing diameter of the spool, substantially as set forth.

DAVID G. WELLS.

Witnesses:
 THOS. H. HUTCHINS,
 WM. J. HUTCHINS.